United States Patent [19]

Inoue et al.

[11] Patent Number: 5,705,274
[45] Date of Patent: Jan. 6, 1998

[54] CHARGING MEMBER, PROCESS FOR PRODUCING CHARGING MEMBER, AND PROCESS CARTRIDGE HAVING THE CHARGING MEMBER

[75] Inventors: Hiroshi Inoue, Kamakura; Yoshiko Fujimura, Yokohama; Naoki Fuei, Kawaguchi, all of Japan

[73] Assignee: Canon Kabushiki Kaisha, Tokyo, Japan

[21] Appl. No.: 542,140

[22] Filed: Oct. 12, 1995

[30] Foreign Application Priority Data

Oct. 18, 1994 [JP] Japan .................................. 6-277240

[51] Int. Cl.⁶ ........................................................ B32B 9/04
[52] U.S. Cl. .................... 428/411.1; 428/457; 428/458; 428/461; 428/465; 492/48; 492/53; 492/56; 399/168
[58] Field of Search ............................... 428/411.1, 457, 428/458, 461, 465; 355/219; 492/48, 53, 56; 399/168

[56] References Cited

U.S. PATENT DOCUMENTS 5,384,626  1/1995  Kugoh et al. .................... 355/219

FOREIGN PATENT DOCUMENTS 0328113  8/1989  European Pat. Off. .
0385462  9/1990  European Pat. Off. .
0602395  6/1994  European Pat. Off. .

OTHER PUBLICATIONS

Patent Abstracts of Japan, vol. 9, No. 304 (P–409) with respect to JP 60-136774 of Jul. 20, 1985 (Nov. 30, 1985).

Primary Examiner—Mark Chapman
Attorney, Agent, or Firm—Fitzpatrick, Cella, Harper & Scinto

[57] ABSTRACT

A charging member has a conductive support, an elastic layer formed on the conductive support, and a tubing layer formed on the elastic layer. Fine particles are present between the tubing layer and a layer provided beneath the tubing layer is contact therewith.

21 Claims, 1 Drawing Sheet

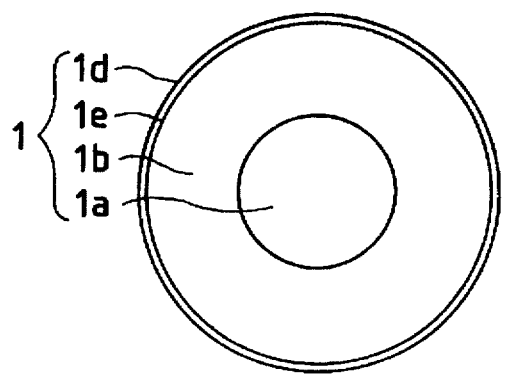
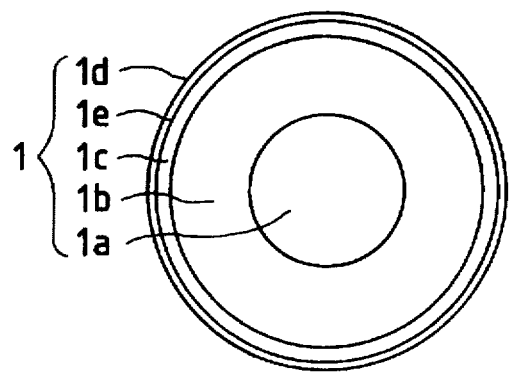
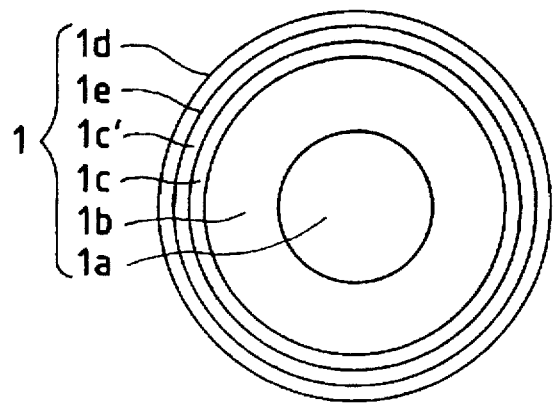
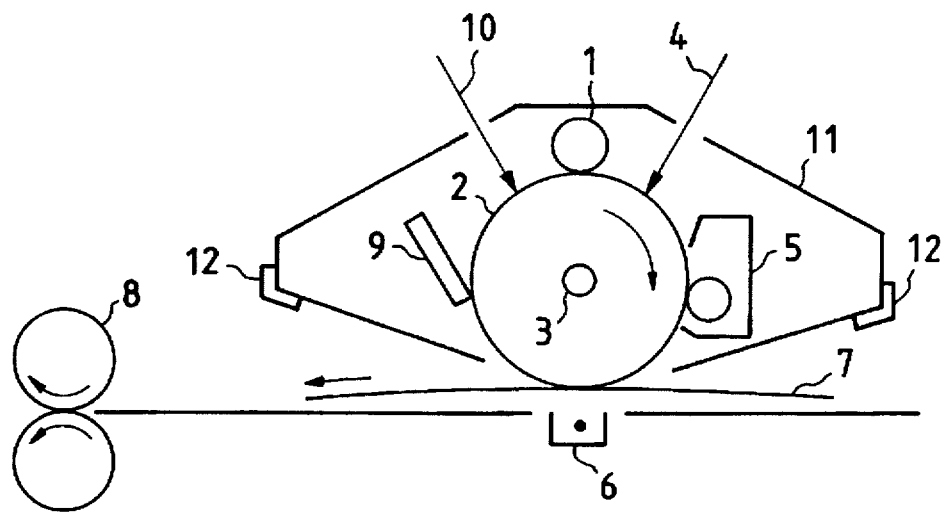

CHARGING MEMBER, PROCESS FOR PRODUCING CHARGING MEMBER, AND PROCESS CARTRIDGE HAVING THE CHARGING MEMBER

BACKGROUND OF THE INVENTION

1. Field of the Invention

This invention relates to a charging member, a process for producing a charging member, and a process cartridge having such a charging member.

2. Related Background Art

In recent years, contact charging is widely used which is a method of electrostatically charging the surface of an image bearing member by applying a voltage to a charging member having the shape of a roller and provided in contact with the image bearing member. Contact charging members have advantages such that they have simple structure, can be small-sized and may very hardly generate ozones. Such charging members are commonly produced in the following way.

(1) Along the periphery of a conductive support (a mandrel) made of a metal, a conductive elastic layer is formed by a process such as extrusion, casting, injection molding, press molding or transfer molding, and a resistance control layer or a surface layer is further formed thereon by dip coating or roll coating.

(2) A seamless tubing having an inner diameter smaller than a roller having the conductive elastic layer is prepared using a synthetic resin or the like, and the roller having the conductive elastic layer is press-fitted to its inside, or a seamless tubing is formed as a shrink tubing (heat-shrinkable) having an inner diameter a little larger than the roller having the conductive elastic layer and is then caused to shrink by heat treatment to bring it into close contact with the conductive elastic layer, to thereby form a tubing layer.

Meanwhile, in electrophotographic image forming apparatus such as copying machines, laser beam printers and facsimile machines, various charging members, e.g., development charging rollers, transfer charging rollers and primary charging rollers have been used. Almost all of these charging rollers have been used up and have not been reused. Also, any rejected products caused during their manufacture can not be used as products and hence have been discarded without being repaired.

This is because these charging rollers have had the problem that, when repeatedly applied to electrophotographic processes, cause a lowering of their electrical properties and no longer exhibit the electrical properties of the same level as the initial stage. The lowering of electrical properties of various charging members may be caused by, e.g., surface deterioration of charging members which is due to the effect of ozone or the like generated by discharge at the time of charging, and surface wear of charging members which is caused by their contact with materials or members to be charged by the charging members.

There is another problem that the surface wear of charging members, caused by their contact with materials or members to be charged by them, may damage surface properties such as lubricity and smoothness.

During repeated use of the charging rollers, powdery developer (toner) and paper dust also may adhere to the whole surfaces or peripheries of their outermost layers.

If such charging rollers are reused without means such as cleaning, the contamination of their surfaces makes surface resistance of charging rollers uneven especially in an environment of low humidity and low temperature to cause non-uniform charging. The charging rollers having caused a lowering of charging performance tend to be affected by such contamination of surfaces.

In addition, the charging members provided in the above electrophotographic apparatus are not limited to those having a single-layer structure, and those having a multi-layer structure, comprising a plurality of layers overlaid one another, are widely used. When the charging members are formed in the multi-layer structure, means such as coating is commonly used. When the layers are formed by coating, defective coatings such as uneven coatings, uneven coating thickness and spitting may occur in some cases. The presence of such defective coatings in charging members makes the surface resistance delicately uneven at that portions to enable no uniform charging to cause faulty images.

The method (1) for the production of rollers, however, has the following problems.

(A) Materials for each layer must be dissolved in an organic solvent to prepare a coating composition and hence the materials are limited. (Unless the solubility coefficient of each layer is changed, the layers are melted each other by the solvent when coated, resulting in a loss of functions of the respective layers.)

(B) Since the resin of each layer has different solubility coefficient, the adhesion between layers is so poor that lifting or wrinkles may occur. Primers may also have to be used in order to improve adhesion, which may possibly cause a cost increase.

(C) Uneven coating or uneven coat thickness tends to occur in each layer.

(D) Since a drying step is required after the coating composition has been coated to form a layer, a poor productivity may result.

(E) Since organic solvents are used to prepare coating compositions, safety measures and equipment therefor must be taken, resulting in a cost increase.

The method (2) for the production of rollers also has the following problems.

(A) When the surface layer or the like is formed using the tubing, a roller having the conductive elastic layer with an outer diameter little different from the inner diameter of the tubing is inserted to the tubing; this is accompanied with a difficulty.

(B) Since the roller having the conductive elastic layer is press-fitted to the tubing formed to have an inner diameter little smaller than that roller, while expanding the inner diameter of the tubing, a great force is applied to the tube to cause it elastically deform. Hence, there is a possibility that the tubing breaks or is formed in non-uniform section.

Recently, ecology (the advocacy of protection of the global environment from destruction and pollution for the purpose of gentle coexistence in the global environment) is also spreading worldwide. From the viewpoint of the saving of global natural resources and the protection of environment, studies are also made on the charging members for electrophotographic apparatus so that they can be remanufactured and reused in some way.

As methods of remanufacturing charging members, a method is known in which the surfaces of members are cleaned with a solvent to remove contamination.

Since, however, the surface layers of charging members are mostly those containing synthetic resin, synthetic rubber or the like, the above prior art cleaning method is not preferable for the following reasons (A) and (B).

(A) Synthetic resins and synthetic rubbers tend to dissolve upon contact with the cleaning solvent or cause cracks, and there is a possibility of damaging various properties required in charging members of this type, such as electrical resistance, hardness, surface roughness, roundness, straightness and lubricity (frictional characteristics).

(B) The charging members of this type are not limited to those having a single-layer structure, and those having a multi-layer structure are widely used. In the case of multi-layer rollers, the cleaning solvent may soak through the layers from the edges of rollers, and care must be taken not only for solvent resistance of surface layer materials but also solvent resistance of inside materials. This not only imposes limitations on the types of cleaning solvents used but also causes a possibility of a decrease in adhesion between layers.

SUMMARY OF THE INVENTION

An object of the present invention is to settle the problems discussed above, to provide a charging member having good performances.

Another object of the present invention is to provide a process for producing the charging member, which is a charging member production process also suited for remanufacturing charging members.

Still another object of the present invention is to provide a process cartridge having such a charging member.

The present invention provides a charging member comprising a conductive support, an elastic layer formed on the conductive support, and a tubing layer formed on the elastic layer;

fine particles being present between the tubing layer and a layer provided beneath the tubing layer in contact therewith.

The present invention also provides a process for producing a charging member comprising a conductive support, an elastic layer formed on the conductive support, and a tubing layer formed on the elastic layer; the process comprising the step of;

forming the tubing layer on the elastic layer by inserting to the inside of a tubing a support having at least the elastic layer, after fine particles have been made or left to adhere to at least one of the surface on which the tubing layer is formed or the inner surface of the tubing.

The present invention also provides a process cartridge having such a charging member.

BRIEF DESCRIPTION OF THE DRAWINGS

FIG. 1 illustrates an example of the layer structure of the charging member according to the present invention.

FIG. 2 illustrates another example of the layer structure of the charging member according to the present invention.

FIG. 3 illustrates still another example of the layer structure of the charging member of the present invention.

FIG. 4 schematically illustrates an example of the construction of an electrophotographic apparatus having a process cartridge having the charging member of the present invention.

DESCRIPTION OF THE PREFERRED EMBODIMENTS

The charging member of the present invention has at least a tubing layer, and fine particles are present between the tubing layer and a layer provided beneath the tubing layer in contact therewith.

The process for producing a charging member, of the present invention has the step of forming the tubing layer on the elastic layer by inserting to the inside of a tubing a support such as a roller having at least the elastic layer, after fine particles have been made or left to adhere to at least one of the surface on which the tubing layer is formed and the inner surface of the tubing.

The charging member of the present invention is free from the problem that may be caused when coating layers are provided by dip coating or roll coating, and has good properties in surface properties or the like.

In the production process of the present invention, when the surface of an elastic layer or an elastic layer having a coating layer thereon is covered with a tubing, fine particles are made or left to be present between the both so that a roller or the like having the elastic layer can be inserted with ease to the inside of the tubing. Thus, there decreases the possibility that the tubing breaks or is formed in non-uniform section.

The fine particles can be made or left to be present between the elastic layer (which may have a coating layer thereon) and the tubing, i.e., made or left to adhere to at least one of the surface on which the tubing layer is formed and the inner surface of the tubing, by adding fine particles to the intended surface in the step of tubing or by leaving particles of powdery developer such as toner to adhere to the intended surface.

The production process of the present invention is effective also as a process for remanufacturing charging members used in electrophotographic apparatus. Charging rollers of electrophotographic apparatus having come to the end of their product life have, in most cases, the problem that they no longer exhibit electrical properties and surface properties (such as smoothness and lubricity) or that the powdery developer (toner) adhering to the whole surfaces or peripheries of their outermost layers causes irregularity in surface resistance of the charging members to cause non-uniform charging. It is not easy to completely remove the toner and so forth having adhered to the surfaces of charging members.

The present invention, however, makes it possible to reuse the charging members having such problems, by covering the periphery of a charging member with a tubing while utilizing fine particles made to adhere to its surface or utilizing as the fine particles the toner left to adhere to the surface, to thereby restore the surface properties of the charging member and at the same time make the surface resistance uniform so that electrical properties required for the charging member is restored to a sufficient condition.

The construction of the charging member of the present invention will be described below.

As shown in FIG. 1, the charging member, denoted by reference numeral 1, of the present invention has the shape of a roller, and comprises a conductive support 1a, an elastic layer 1b integrally formed on its periphery, and a tubing layer 1d formed on the periphery of the elastic layer. Between the elastic layer and the tubing layer (1e), fine particles are present (not shown).

As other embodiments, the charging member of the present invention may be constructed as shown in FIG. 2 or 3. As shown in FIG. 2, the charging member comprises a resistance control layer 1c formed on the periphery of an elastic layer 1b for the purpose of controlling the surface resistance of the charging member, and a tubing layer 1d formed on the periphery of the resistance control layer 1c. In this instance, fine particles are present between the resistance control layer 1c and the tubing layer 1d (1e). As also shown in FIG. 3, the charging member may comprise a resistance control layer provided in two or more layers. Such resistance control layers may be comprised of a first resistance control layer 1c and a second resistance control layer 1c'.

The conductive support 1 used in the present invention may be made of metal such as iron, copper, stainless steel, aluminum or nickel, any of which may be used. The metal surface thereof may be further treated by plating for the purpose of rust-proofing or providing scratch resistance, but it is necessary not to damage conductivity.

In the charging roller 1, the elastic layer 1b is endowed with an elasticity suitable for ensuring good and uniform close contact of the charging roller 1 with a photosensitive member 2 (FIG. 4).

Conductivity of the elastic layer 1b is controlled by adding a conductive agent such as carbon black to an elastic material such as rubber. Its elasticity is controlled by adding a process oil, a plasticizer and so forth. The elastic material for the elastic layer 1b may specifically include, for example, natural rubber, synthetic rubbers such as ethylene propylene diene methylene rubber (EPDM), styrene-butadiene rubber (SBR), silicone rubber, urethane rubber, epichlorohydrin rubber, isoprene rubber (IR), butadiene rubber (BR), nitrile-butadiene rubber (NBR) and chloroprene rubber (CR), and also resins such as polyamide resin, polyurethane resin, silicone resin and fluorine resin. A foam of the above elastic material may also be used in the elastic layer 1b.

The tubing layer 1d is a layer formed by press-fitting of a roller into a tubing or by heat shrinkage of a tubing, as previously mentioned, and is often provided in order to control the surface properties (such as smoothness and lubricity) of the charging member or to prevent a plasticizer or the like in the elastic layer 1b from bleeding out to the surface of the charging member. Materials therefor may specifically include synthetic resins containing conductive particles such as carbon black and carbon graphite, conductive metal oxides such as conductive titanium oxide, conductive zinc oxide and conductive tin oxide as well as alkali metal salts and ammonium salts. The synthetic resin used in the tubing layer 1d may include resins such as nylon 12, PFA (tetrafluoroethylene-perfluoroalkyl vinyl ether copolymer resin), PVDF (polyvinylidene fluoride), FEP (tetrafluoroethylene-hexafluoropropylene copolymer resin), and also thermoplastic elastomers of a polystyrene type, a polyolefin type, a polyvinyl chloride type, a polyurethane type, a polyester type or a polyamide type.

The tubing layer 1d may be formed of either a heat-shrinkable tubing or a non-heat-shrinkable tubing.

The tubing layer 1d may preferably have a wall thickness of 5,000 μm or less. In order to well bring out the function of a layer lying beneath the tubing layer such as an elastic layer or a resistance control layer, it is more preferable for the tubing to have a smaller wall thickness. For this purpose, it may more preferably have a wall thickness within the range of from 1 to 1,000 μm.

The resistance control layer 1c is often provided in order to control the surface resistance of charging members. Materials for the resistance control layer 1c may specifically include resins such as polyamide resin, polyurethane resin, fluorine resin and silicone resin, and also epichlorohydrin rubber, urethane rubber, chloroprene rubber and acrylonitrile rubbers. For the purpose of resistance control, a conductive agent may be dispersed also in the resistance control layer 1c, which includes conductive particles such as carbon black and carbon graphite, conductive metal oxides such as conductive titanium oxide, conductive zinc oxide and conductive tin oxide, as well as alkali metal salts and ammonium salts.

The fine particles used in the present invention may be any of those which can impart a lubricity to the boundary between the tubing layer 1d and its underlying layer. As preferred examples, they may include fine resin particles, solid lubricants, magnetic materials, metal oxides, fine silica particles, carbon, calcium carbonate, clay, glass bulb powder, and toners. They may be added in an amount within which the present invention can be effective, and there are no particular limitations.

The fine resin particles may specifically include fine particles of polystyrene resins, polyester resins, polyolefin resins, urethane resin or rubber, polyamide resin, silicone resin or rubber, fluorine resin or rubber, phenol resin, acrylic resins, epoxy resins and so forth.

As the solid lubricants, graphite, talc, mica and so forth may be used.

The magnetic materials may include iron oxides such as magnetite, hematite and ferrite, metals such as iron, cobalt and nickel, or alloys or mixtures of of any of these metals with a metal such as aluminum, cobalt, copper, lead, magnesium, tin, zinc, antimony, beryllium, bismuth, cadmium, calcium, manganese, selenium, titanium, tungsten or vanadium.

The metal oxides may include magnesium oxide, cerium oxide, titanium oxide, aluminum oxide, zinc oxide, antimony oxide and tin oxide.

As the silica, untreated fine silica powder may be used. It may also be treated with a treating agent including silicone varnish, modified silicone varnishes of various types, silicone oil, modified silicone oils of various types, silane coupling agents, silane coupling agents having functional groups, and other organosilicon compounds, or other various treating agents.

The fine particles used in the present invention may have an average particle diameter of 50 μm or smaller, and particularly from 0.01 to 50 μm. Such an average particle diameter is a simple average value obtained by measuring, using an electron microscope, particle diameters of 100 particles selected at random, and dividing the total sum of them by the number of the particles, 100. Since, however, the particles are not always all spherical, a value obtained by totaling major axis diameter and minor axis diameter and dividing the total by 2 is regarded as particle diameter of individual particles. If the particles have an average particle diameter exceeding 50 μm, the surface of the charging member tends to be uneven or wavy because of such particles, even when covered with the tubing, resulting in a loss of smoothness in some cases. As the result, in the contact charging system where the charging member and the photosensitive member come in touch, the contact between the charging member and the photosensitive member can not be in a uniform state and a gap may be partially formed between them to cause poor charging.

When the charging roller of the present invention is used, its surface irregularities may cause delicate charge non-uniformity if the charging roller has a rough surface, without regard to whether the relation between the charging roller and the photosensitive member is of contact or non-contact, and consequently faulty images may occur. Hence, the charging roller may preferably have a smoother surface and may preferably have a 10-point average surface roughness Rz of 100 μm or less, and more preferably from 15 μm or less, according to JIS B0601 standard of surface roughness.

The charging member may also preferably have a volume resistivity within the range of from $10^4$ to $10^{14}$ Ω·cm. If it is less than $10^4$ Ω·cm, and when pinholes have occurred in the photosensitive member for some reason and the part where the pinholes are present comes to the charging zone at which the photosensitive member and the charging member form a nip, a leakage of currents may occur across the charging member and the pinholes of the photosensitive member to cause a great drop of voltage at the power supply. Hence, during the leakage, the charging becomes poor at the nip between the charging member and the photosensitive member in its entire longitudinal direction, so that in actual images an uneven image appears at every rotational period of the photosensitive member, which appears in black stripes in reverse development or in white stripes in regular development, resulting in a lowering of image quality. If on the other hand it exceeds $10^{14}$ Ω·cm, the resistance of the charging member may be too high to charge the photosensitive member at the desired potential, resulting in poor charging. This problem can be settled to a certain extent by correspondingly increasing the voltage to be supplied, which, however, makes efficiency very poor and is not practical.

In the present invention, the volume resistivity is measured according to JIS K6911.

FIG. 4 schematically illustrates the construction of an electrophotographic apparatus having a process cartridge having the charging member of the present invention as a primary charging means.

In FIG. 4, reference numeral 2 denotes an electrophotographic photosensitive member, which is rotated around an axis 3 in the direction of an arrow at a given peripheral speed. The photosensitive member 2 is uniformly charged on its periphery to a positive or negative, given potential through the charging member 1 of the present invention, serving as a primary charging means. The photosensitive member thus charged is then photoimagewise exposed to light 4 emitted from an imagewise exposure means (not shown) for slit exposure or laser beam scanning exposure. Thus, electrostatic latent images are successively formed on the periphery of the photosensitive member 2.

The electrostatic latent images thus formed are subsequently developed by toner by the operation of a developing means 5. The resulting toner-developed images are then successively transferred by the operation of a transfer means 6, to the surface of a transfer medium 7 fed from a paper feed section (not shown) to the part between the photosensitive member 2 and the transfer means 6 in the manner synchronized with the rotation of the photosensitive member 2.

The transfer medium 7 on which the images have been transferred is separated from the surface of the photosensitive member, is led through an image fixing means 8, where the images are fixed, and is then printed out of the apparatus as a copied material (copy).

The surface of the photosensitive member 2 after the transfer of images is brought to removal of the toner remaining after the transfer, through a cleaning means 9. Thus the photosensitive member is cleaned on its surface, further subjected to charge elimination by pre-exposure light 10 emitted from a pre-exposure means (not shown), and then repeatedly used for the formation of images. Since in the present invention the charging member 1 is a contact charging member, the pre-exposure is not necessarily required.

In the present invention, the apparatus may be constituted of a combination of plural components integrally joined as a process cartridge from among the constituents such as the above electrophotographic photosensitive member 2, charging means 1, developing means 5 and cleaning means 9 so that the process cartridge is detachable from the body of the electrophotographic apparatus such as a copying machine or a laser beam printer. For example, at least one of the electrophotographic photosensitive member 2, the developing means 5 and the cleaning means 9 may be integrally supported in a cartridge to form a process cartridge 11 that is detachable from the body of the apparatus through a guide means such as a rail 12 provided in the body of the apparatus.

In the case when the electrophotographic apparatus is used as a copying machine or a printer, the light 4 of the imagewise exposure is light reflected from, or transmitted through, an original, or light irradiated by the scanning of a laser beam, the driving of an LED array or the driving of a liquid crystal shutters array according to signals obtained by reading an original with a sensor and converting the information into signals.

The present invention will be described below in greater detail by giving Examples.

Example 1

A charging roller as the charging member of the present invention was produced according to the following procedure.

|  | (by weight) |
| --- | --- |
| SBR | 100 parts |
| Carbon black | 35 parts |
| Zinc oxide | 5 parts |
| Fatty acid | 2 parts |

The above materials were kneaded for 10 minutes by means of a closed mixer controlled to 60° C. and thereafter 30 parts by weight of naphthene oil was added based on 100 parts by weight of the SBR, followed by further kneading for 20 minutes by means of a closed mixer cooled to 20° C. to prepare a material compound. To this material compound, as a vulcanizing agent 0.5 part by weight of sulfur and as vulcanizing accelerators 1 part by weight of a thiazole type vulcanizing accelerator and 1 part by weight of a thiurum type vulcanizing accelerator were added, all based on 100 parts by weight of the material rubber SBR, followed by kneading for 10 minutes by means of a twin-roll mill cooled to 20° C. The compound thus obtained was vulcanizing-molded around a stainless steel mandrel of 6 mm diameter by means of a press molding machine to form an elastic layer so as to have the shape of a roller of 12 mm in external diameter.

On the elastic layer, a tubing layer as shown below was further formed.

|  | (by weight) |
| --- | --- |
| Nylon 12 | 100 parts |
| Conductive carbon black | 20 parts |

First, the above materials were melt-kneaded and extruded into a tube, followed by stretching to obtain a tubing having an inner diameter of 14 mm and a wall thickness of 100 μm before heat shrinking. In order to make it easy to insert into this tubing the roller having the elastic layer, silicone resin powder serving as the fine particles was made to adhere to the surface of the elastic layer, and then the roller having the elastic layer was inserted to the inside of the tubing, followed by heating at 100° C. for 2 minutes to cause the tubing to heat-shrink on the charging roller to form a tubing layer thereon. Thus, the charging roller of the present invention was obtained.

The average particle diameter of the silicone resin powder used as the fine particles was 5 μm.

Along the periphery of the charging roller thus obtained, aluminum foil of 10 mm wide was wound in close contact and a direct voltage (250 V) was applied across the support and the aluminum foil to measure the resistance of the charging roller in an environment of temperature 23.5° C. and humidity 50% (environment 1) by means of a resistance meter HIOKI 3119 DEGITAL MΩ HI TESTER (manufactured by Hioki Denki K.K.). Results obtained are shown in Table 1.

The surface roughness (Rz) of the charging roller obtained was also measured by the method previously described. Results obtained are shown in Table 1.

This charging roller was set in a virgin process cartridge (trade name: EP-E Toner Cartridge) and was used as a charging roller located at the primary charging assembly of a laser beam printer (trade name: LBP-8 Mark IV; manufactured by Canon Inc.) to make a 6,000 sheet image reproduction running test. Images obtained at the initial stage and after the 6,000 sheet running were visually observed to evaluate image quality. Results obtained are shown in Table 2. In Table 2, "A" indicates that the images obtained are good; "B", practically usable; and "C", practically unusable.

The above image reproduction running test was made in an environment of temperature 23.5° C. and humidity 50% (environment 1), an environment of temperature 15° C. and humidity 10% (environment 2) and an environment of temperature 30° C. and humidity 80% (environment 3).

Example 2

A charging member was recyclingly remanufactured by the process of the present invention, according to the following procedure.

A process cartridge (model name: EP-E Toner Cartridge; average particle diameter of toner: 6 μm) used in a laser beam printer (trade name: LBP-8 Mark IV; manufactured by Canon Inc.) was detached after images were reproduced on 6,000 sheets. Its charging roller was taken out of the process cartridge, and was used as a base for the charging roller of the present invention. The charging roller before remanufacturing is comprised of a conductive support, an elastic layer, a first resistance control layer and a second resistance control layer. To the surface of the charging roller taken out, powdery developer (toner) has adhered. The charging roller has an outer diameter of 12 mm.

Air was lightly blown to the surface of the above charging roller and thereafter a tubing layer as shown below was formed thereon.

|  | (by weight) |
| --- | --- |
| Polyethylene resin | 100 parts |
| Conductive carbon black | 15 parts |

First, the above materials were melt-kneaded and then extruded into a tube, followed by stretching to obtain a tubing having an inner diameter of 15 mm and a wall thickness of 40 μm before heat shrinking. The above charging roller was inserted to the inside of the tubing, followed by heating at 100° C. for 2 minutes to form a tubing layer thereon. Thus, the charging roller of the present invention was obtained. In the present Example, the powdery developer having adhered to the surface of the charging member after its use serves as the fine particles.

Evaluation on the charging roller thus obtained was made in the same manner as in Example 1. Results obtained are shown in Tables 1 and 2.

Example 3

A roller having an elastic layer was prepared in the same manner as in Example 1, and a resistance control layer as shown below was formed on the elastic layer for the purpose of controlling surface resistance of the charging member.

|  | (by weight) |
| --- | --- |
| Polyurethane resin | 100 parts |
| Carbon black | 6 parts |

As materials for the resistance control layer, the above materials were dispersed and dissolved in a methyl ethyl ketone (MEK) solvent to prepare a coating composition. This coating composition was coated on the elastic layer by dipping to form a resistance control layer in a layer thickness of 100 μm.

Next, on the resistance control layer, a tubing layer as shown below was further formed.

|  | (by weight) |
| --- | --- |
| PVDF (polyvinylidene fluoride) resin | 100 parts |
| Conductive carbon black | 10 parts |

First, the above materials were melt-kneaded and then extruded into a tube, followed by stretching to obtain a tubing having an inner diameter of 14.5 mm and a wall thickness of 70 μm before heat shrinking. As the fine particles, fine tin oxide particles were made to adhere to the surface of the resistance control layer, and then the roller having the elastic layer and the resistance control layer was inserted to the inside of the tubing, followed by heating at 100° C. for 2 minutes to cause the tubing to heat-shrink on the charging roller to form a tubing layer thereon. Thus, the charging roller of the present invention was obtained.

The average particle diameter of the fine tin oxide particles used as the fine particles was 0.2 μm.

Evaluation on the charging roller thus obtained was made in the same manner as in Example 1. Results obtained are shown in Tables 1 and 2.

Example 4

A charging roller was produced in the same manner as in Example 1 except that the carbon black used in the tubing layer was replaced with 30 parts by weight of conductive titanium oxide.

Evaluation on the charging roller thus obtained was made in the same manner as in Example 1. Results obtained are shown in Tables 1 and 2.

Example 5

A charging roller was produced in the same manner as in Example 1 except that the silicone resin powder used as the fine particles was replaced with graphite. Evaluation was made similarly. Results obtained are shown in Tables 1 and 2. The graphite used as the fine particles had an average particle diameter of 7 μm.

Example 6

A charging roller was produced in the same manner as in Example 1 except that the nylon 12 used in the tubing layer was replaced with 100 parts by weight of polyurethane resin and the silicone resin powder used as the fine particles was replaced with fine silica powder. Evaluation was made similarly. Results obtained are shown in Tables 1 and 2.

Example 7

A charging roller was produced in the same manner as in Example 1 except that the carbon black used in the tubing layer was replaced with 2 parts by weight of lithium perchlorate. Evaluation was made similarly. Results obtained are shown in Tables 1 and 2.

Example 8

A charging roller was produced in the same manner as in Example 1 except that the fine particles were made to adhere not to the surface of the elastic layer but to the inner surface of the tubing. Evaluation was made similarly. Results obtained are shown in Tables 1 and 2.

Example 9

The procedure of Example 2 was repeated except that in place of the air blow the charging member was wiped with a cleaning wiper wetted with MEK (methyl ethyl ketone). Evaluation was made similarly. Results obtained are shown in Tables 1 and 2.

The surface of the charging member having been wiped with the cleaning wiper wetted with MEK was subjected to infrared absorption analysis and X-ray microscopy. As a result, polystyrene resin, magnetic material, silica and so forth were detected. Even if the charging roller to which the toner has adhered is wiped with the solvent such as MEK, the toner adhering thereto can not be completely removed. Hence, consequently the powdery developer or a part thereof is present between the tubing layer and the second resistance control layer.

Comparative Example 1

A charging roller was produced in the same manner as in Example 3 except that the tin oxide particles used as the fine particles was not used. As a result, the tubing tended to stick to the resistance control layer to make it difficult to insert the roller. Also, the tubing layer of the charging roller obtained was seen to have wrinkled. Hence, the physical properties of the coating composition were not evaluated and only the images were evaluated in the same manner as in Example 1. Results obtained are shown in Tables 1 and 2.

Comparative Example 2

A process cartridge (model name: EP-E Toner Cartridge) used in a laser beam printer (trade name: LBP-8 Mark IV; manufactured by Canon Inc.) was detached after images were reproduced on 5,000 sheets. Its charging roller was taken out of the process cartridge. To the surface of the charging roller taken out, powdery developer (toner) had adhered.

This charging roller was set in a virgin process cartridge (trade name: EP-E Toner Cartridge) as it was, and was used as a charging roller located at the primary charging assembly of the laser beam printer (trade name: LBP-8 Mark IV; manufactured by Canon Inc.). Evaluation was made in the same manner as in Example 1. Results obtained are shown in Tables 1 and 2. Here, the measurement of resistance and measurement of surface roughness were made on the charging roller before the image reproduction running test, on which the powdery developer had adhered to its surface.

In the environment 2, non-uniform charging caused by contamination of the charging roller occurred in halftone image areas at the latter-half stage (4,500 sheet) of the image reproduction running test.

TABLE 1

Roller Resistance and Surface Roughness

| | Resistance (MΩ) | | | Surface roughness |
|---|---|---|---|---|
| | Edge | Middle | Edge | Rz (μm) |
| Example: | | | | |
| 1 | 0.72 | 0.79 | 0.84 | 4.269 |
| 2 | 1.02 | 0.99 | 1.20 | 4.421 |
| 3 | 0.95 | 0.88 | 0.92 | 4.020 |
| 4 | 1.13 | 1.05 | 1.04 | 3.976 |
| 5 | 0.78 | 0.70 | 0.71 | 4.872 |
| 6 | 0.90 | 1.02 | 0.96 | 4.008 |
| 7 | 1.25 | 1.33 | 1.08 | 3.788 |
| 8 | 0.74 | 0.84 | 0.84 | 4.335 |
| 9 | 0.95 | 0.99 | 0.82 | 4.361 |
| Comparative Example: | | | | |
| 1 | — | — | — | — |
| 2 | 3.38 | 3.91 | 2.95 | 3.685 |

TABLE 2

Results of Image Reproduction Running Test

| | Environment 1 | | Environment 2 | | Environment 3 | |
|---|---|---|---|---|---|---|
| | Initial stage | 6,000 sheets | Initial stage | 6,000 sheets | Initial stage | 6,000 sheets |
| Example: | | | | | | |
| 1 | A | A | A | A | A | A |
| 2 | A | A | A | A | A | A |
| 3 | A | A | A | A | A | A |
| 4 | A | A | A | A | A | A |
| 5 | A | A | A | A | A | A |
| 6 | A | B | A | B | A | B |
| 7 | A | A | A | A | A | A |
| 8 | A | A | A | A | A | A |
| 9 | A | A | A | A | A | A |
| Comparative Example: | | | | | | |
| 1 | A | B | C | — | A | B |
| 2 | A | A | A | C | A | A |

What is claimed is:

1. A charging member comprising a conductive support, an elastic layer formed on the conductive support, and a tubing layer formed on the elastic layer;

fine particles being present between said tubing layer and a layer provided beneath said tubing layer in contact therewith;

wherein said charging member is for use in electrophotography.

2. The charging member according to claim 1, wherein said fine particles have an average particle diameter of 50 μm or less.

3. The charging member according to claim 2, wherein said fine particles have an average particle diameter of from 0.01 μm to 50 μm.

4. The charging member according to any one of claims 1 to 3, wherein said fine particles are fine particles of a material selected from the group consisting of a resin, a solid lubricant, a magnetic material, a metal oxide, a silica and a toner.

5. The charging member according to any one of claims 1 to 3, wherein said charging member has the shape of a roller.

6. The charging member according to any one of claims 1 to 3, wherein said charging member is a charging member having been remanufactured.

7. The charging member according to claim 1, wherein said charging member is provided in contact with an electrophotographic photosensitive member and electrostatically charges the electrophotographic photosensitive member upon application of a voltage.

8. A process for producing a charging member comprising a conductive support, an elastic layer formed on the conductive support, and a tubing layer formed on the elastic layer; said process comprising the step of;

forming said tubing layer on said elastic layer by inserting to the inside of a tubing a support having at least said elastic layer, after fine particles have been made or left to adhere to at least one of the surface on which said tubing layer is formed and the inner surface of the tubing;

wherein said charging member is for use in electrophotography.

9. The process according to claim 8, wherein said fine particles have an average particle diameter of 50 μm or less.

10. The process according to claim 9, wherein said fine particles have an average particle diameter of from 0.01 μm to 50 μm.

11. The process according to any one of claims 8 to 10, wherein said fine particles are fine particles of a material selected from the group consisting of a resin, a solid lubricant, a magnetic material, a metal oxide, a silica and a toner.

12. The process according to any one of claims 8 to 10, wherein said charging member has the shape of a roller.

13. The process according to any one of claims 8 to 10, wherein said production process is a process for remanufacturing the charging member.

14. The process according to claim 8, wherein said charging member is provided in contact with an electrophotographic photosensitive member and electrostatically charges the electrophotographic photosensitive member upon application of a voltage.

15. A process cartridge comprising a charging means having a charging member and an additional means selected from the group consisting of an electrophotographic photosensitive member, a developing means and a cleaning means;

said charging member having an elastic layer on a conductive support and a tubing layer on the elastic layer;

fine particles being present between said tubing layer and a layer provided beneath said tubing layer in contact therewith; and said charging member and said additional means being integrally supported in and detachable from the body of an electrophotographic apparatus.

16. The process cartridge according to claim 15, wherein said fine particles have an average particle diameter of 50 μm or less.

17. The process cartridge according to claim 16, wherein said fine particles have an average particle diameter of from 0.01 μm to 50 μm.

18. The process cartridge according to any one of claims 15 to 17, wherein said fine particles are fine particles of a material selected from the group consisting of a resin, a solid lubricant, a magnetic material, a metal oxide, a silica and a toner.

19. The process cartridge according to any one of claims 15 to 17, wherein said charging member is provided in contact with the electrophotographic photosensitive member.

20. The process cartridge according to any one of claims 15 to 17, wherein said charging member has the shape of a roller.

21. The process cartridge according to any one of claims 15 to 17, wherein said charging member is a charging member having been remanufactured.

* * * * *

UNITED STATES PATENT AND TRADEMARK OFFICE
CERTIFICATE OF CORRECTION

PATENT NO. : 5,705,274
DATED : January 6, 1998
INVENTOR(S) : HIROSHI INOUE, ET AL.

It is certified that error appears in the above-identified patent and that said Letters Patent is hereby corrected as shown below:

Item [57] ABSTRACT:

Line 5, "is" should read --in--.

COLUMN 2:

Line 8, "overlaid" should read --overlaid on--.
Line 15, "that" should read --those--.
Line 23, "each" should read --into each--.
Line 50, "it" should read --it to--.

COLUMN 4:

Line 51, "is" should read --are--.

COLUMN 6:

Line 26, "of" (second occurrence) should be deleted.
Line 58, "and" should be deleted.

UNITED STATES PATENT AND TRADEMARK OFFICE
CERTIFICATE OF CORRECTION

PATENT NO. : 5,705,274
DATED : January 6, 1998
INVENTOR(S) : HIROSHI INOUE, ET AL.

It is certified that error appears in the above-identified patent and that said Letters Patent is hereby corrected as shown below:

COLUMN 8:

Line 20, "shutters" should read --shutter--.

COLUMN 14:

Line 2, "production" should be deleted.

Signed and Sealed this

Twenty-third Day of June, 1998

Attest:

BRUCE LEHMAN

*Attesting Officer*     *Commissioner of Patents and Trademarks*